United States Patent [19]

Gleason et al.

[11] 4,322,393

[45] Mar. 30, 1982

[54] PROCESS FOR DRYING CALCIUM CHLORIDE GENERATED IN HIGH CHLORIDE FLUE GAS DESULFURIZATION SYSTEMS

[75] Inventors: Robert J. Gleason; Chin T. Sui, both of Somerville, N.J.

[73] Assignee: Research-Cottrell, Inc., Somerville, N.J.

[21] Appl. No.: 207,462

[22] Filed: Nov. 17, 1980

[51] Int. Cl.$^3$ .................. C01B 17/00; C01F 5/26; C01F 11/20
[52] U.S. Cl. .................. 423/242; 423/497; 159/4 A
[58] Field of Search ............... 423/490, 497; 423/242 A, 242 R, 243, 244 A, 244 R; 159/4 A

[56] References Cited

U.S. PATENT DOCUMENTS

| | | | |
|---|---|---|---|
| 1,958,034 | 5/1934 | Collings | 423/497 |
| 3,386,798 | 6/1968 | Bevans et al. | 423/497 |
| 3,826,816 | 7/1974 | McCormick | 423/497 |
| 3,929,968 | 12/1975 | Taub | 423/242 |
| 4,136,998 | 1/1979 | Bussier et al. | 405/267 |

*Primary Examiner*—Earl C. Thomas
*Assistant Examiner*—Gregory A. Heller
*Attorney, Agent, or Firm*—Kerkam, Stowell, Kondracki & Clarke

[57] ABSTRACT

Some flue gas desulfurization processes applied to fuels containing high chloride concentrations are utilizing, or plan to utilize, by-product gypsum from the process stream. The utilization of such a process results in a calcium chloride buildup in the flue gas desulfurization system from fuels or water resource containing significant chlorides which interferes with the absorption and utilization of the lime or limestone reagent.

In this invention, a method is used to convert the calcium chloride to a dry material by utilizing flue gas at elevated temperatures, normally found before an air preheater on steam generators used to produce power or any other conventional large size steam boilers. The monohydrate is produced at temperatures above 350° F. By applying this drying process with a power plant system, energy consumed for this drying operation is very efficient.

9 Claims, 2 Drawing Figures

4,322,393

PROCESS FOR DRYING CALCIUM CHLORIDE GENERATED IN HIGH CHLORIDE FLUE GAS DESULFURIZATION SYSTEMS

TECHNICAL FIELD

This invention is directed to a method for converting calcium chloride to a dry material for simple disposal by utilizing flue gas at elevated temperatures and prior to desulfurization thereof as the source process heat.

BACKGROUND OF THE PRIOR ART

Flue gas desulfurization processes applied to fuels containing high chloride concentrations utilize by-product gypsum from the process stream.

One such process for making by-product gypsum is disclosed in U.S. Pat. No. 4,136,998 Bassier et al.

The utilization of a by-product gypsum process results in a calcium chloride buildup in the Fuel Gas Desulfurization system from fuels or water resource containing significant chlorides which interferes with the absorption and utilization of the lime or limestone reagent. Process systems proposed for such conditions result in a generation of solutions and slurries of calcium chloride. Although these materials can be processed into concentrated brines they still constitute a problem in handling and ultimate disposal. One method for converting the calcium chloride brine to a less difficult to handle material is to dry calcium chloride at elevated temperatures to form either the monohydrate or anhydrous calcium chloride. In either the monohydrate or anhydrous form, the calcium chloride handles much better in conventional conveying equipment.

Calcium chloride-dihydrate to hexahydrate are deliquescent in property. These forms of calcium chloride, when exposed to the atmosphere absorb water on the solid surfaces. The resulting surface moisture content influences the physical properties such that partial agglomeration and surface liquefaction occurs. The anhydrous and monohydrate forms are much lower in deliquescent tendencies and maintain the particle free flow much better in conventional solids. But, drying operations to form anhydrous and monohydrates are costly and energy consuming.

BRIEF SUMMARY OF THE INVENTION

In this invention, a method is used to convert the calcium chloride to a dry material by utilizing flue gas at elevated temperatures, normally found before an air preheater on steam generators used to produce power or any other conventional large size steam boilers. The monohydrate is produced at temperatures above 350° F. By applying this drying process with a power plant system, energy consumed for this drying operation is very efficient.

Normal Fuel Gas Desulfurization systems cool the flue gas by evaporation of water. This invention, in part, can substitute some fraction of the cooling process and conserve on the energy required for evaporation and drying. In addition, the drying operation can be designed to operate during reduced power plant loads when boiler capacity demand is lowered (off peak operation).

These and other objects and advantages are provided by the method of flue gas desulfurization comprising the steps:

1. by passing a portion of hot combustion gas to a spray dryer;
2. directing a concentrated calcium chloride brine to the spray dryer;
3. removing dry predominately calcium chloride monohydrate or anhydrate from the spray dryer;
4. redirecting the by-passed gas to the main gas stream;
5. directing gas stream serially through a gas cleaner and/or gas quencher-scrubber;
6. directing a limestone slurry to the gas quencher-scrubber; and
7. removing calcium sulfate from the spent limestone slurry and directing the remainder of the slurry to a brine concentrator.

BRIEF DESCRIPTION OF THE DRAWINGS

The invention will be more particularly described in reference to the drawing wherein.

DETAILED DESCRIPTION OF THE INVENTION

Figure 1:
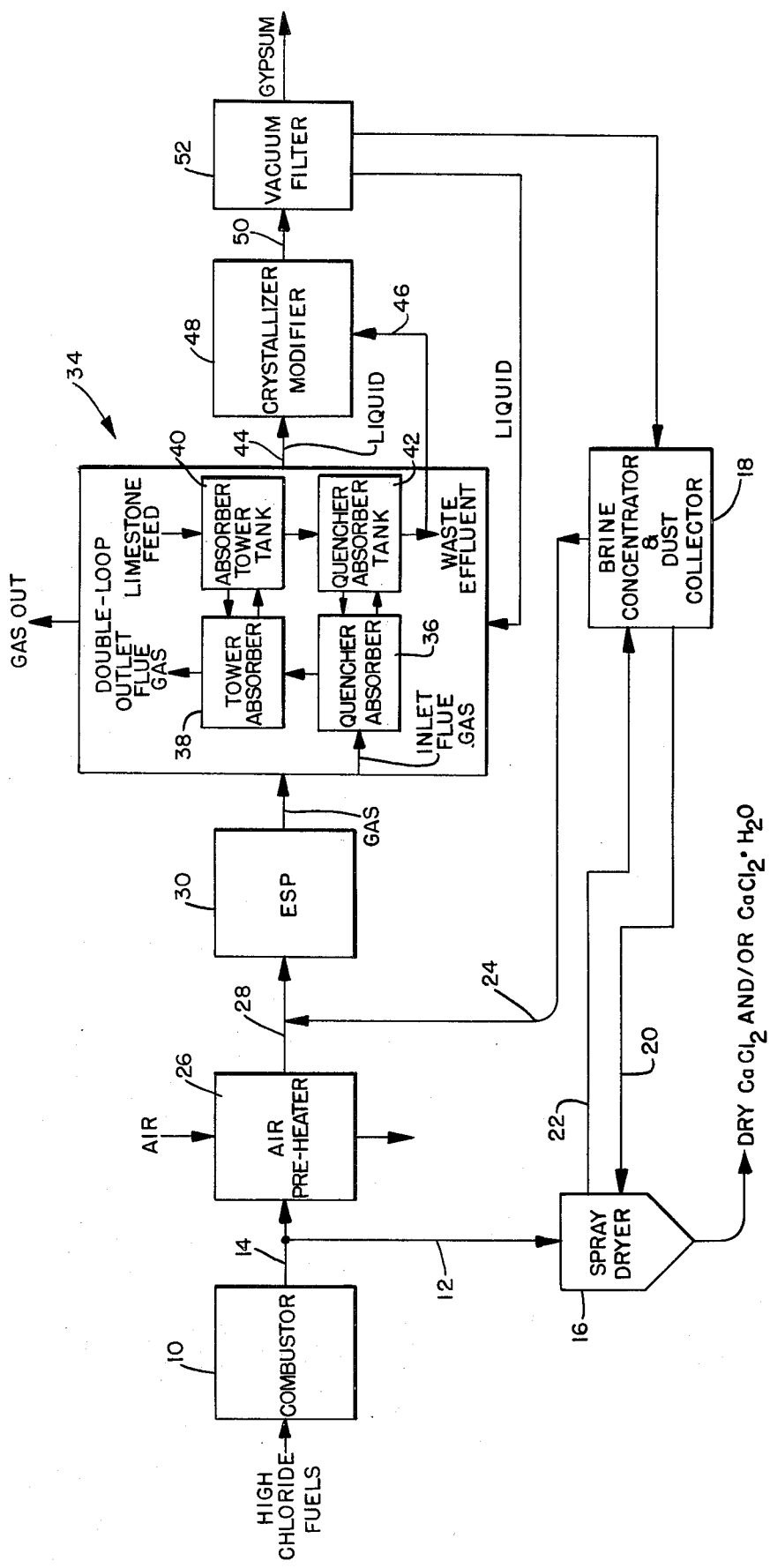
FIG. 1 is a diagramatic showing of one form of apparatus for carrying out an aspect of the present invention.

In FIG. 1 a flue gas containing some sulfur dioxide (1000 ppm of $SO_2$) and some chloride (100 ppm $Cl^-$) exits a typical Combustor 10 in a coal fired application. The Combustor exit gas contains normal combustion gas components at approximately 750° F. and pressures normal to the plant conditions. A small fraction of the hot flue gas is extracted via conduit 12 from the main gas stream 14 and passed through a spray dryer 16. Within the spray dryer 16 a slurry or brine from brine concentrator and dust collector 18 via conduit 20 containing calcium chloride and some small fraction of calcium sulfate, is contacted with hot flue gas and adiabatically cooled to approximately 725° F. In this case the flue gas then passes via conduit 22, through the brine concentrator 18 where further heat extraction occurs and a brine containing approximately 35% calcium chloride ($CaCl_2$) is generated. Simultaneous to concentrating the $CaCl_2$ some part of the calcium chloride monohydrate ($CaCl_2 \cdot H_2O$) generated in the spray dryer is captured by the brine concentrator and dust collector 18.

The gas stream leaving the concentrator 18 is directed via conduit 24 to the flue gas main stream leaving an air pre-heater 26 via flue 18.

From the pre-heater the combined gas stream is directed to an electrostatic precipitator 30 where 99+% of the solids in the flue gas are removed.

From the precipitator 30 of the flue gas passes to a double loop gas quencher-$SO_2$ absorber 34.

The absorber 38 is provided with limestone slurry from tank 40 while the quencher is provided with a limestone slurry from tank 42 and from tank 40.

$SO_2$-rich flue gas coming from the precipitator 30 is first quenched with a recirculating limestone slurry in an environment where the pH is approximately 5. Since the reagent has already passed through the absorber 38, it is fairly well spent and contains a high proportion of reaction products. But since so much $SO_2$ is present in the gas stream, there is sufficient reactive driving force to neutralize a portion of the $SO_2$ and react virtually all the reagent. The flue gas, having been quenched to its saturation level and some of its $SO_2$ removed, now passes through absorber 38. The rising flue gas may contact a series of sprays which remove more $SO_2$ before the flue gas enters the primary absorber 38. Here a proprietary, low-pressure drop, high surface area contactor permits high $SO_2$ transfer from gas phase to liquid phase. However, since the previous spray sections has conditioned the gas and removed a fair amount of $SO_2$, the sulfur dioxide entering the primary absorber is limited to a concentrator where the slurry is not at or near the saturation level which causes scaling.

The slurry falls gravitationally through the absorber section where it is discharged to the hold tank 40 for desupersaturation before being recirculated. This absorber section operates open-loop. Fresh reagent and make-up water are added to this loop. Reaction products are discharged to the quencher tank 42. As a result, the chloride level remains low in the absorber, so expensive alloys for chloride protection are not required here.

Table 1 illustrates the calcium chloride build-up in a two loop system as illustrated at 34.

TABLE I

CHLORIDE BUILDUP IN AN $SO_2$ ABSORBER TOWER

| % SOLIDS IN UNDER- FLOW | PPM CHLO- RIDES IN WATER | % CHLO- RINE IN COAL | PPM CHLO- RIDES IN AB- SORBER LOOP | PPM CHLO- RIDES IN QUEN- CHER LOOP |
|---|---|---|---|---|
| 15 | 100 | .01 | 264 | 710 |
| | 2100 | .01 | 2,281 | 5,257 |
| | 100 | .02 | 428 | 1,193 |
| | 2100 | .02 | 2,445 | 5,741 |
| 50 | 100 | .01 | 264 | 3,560 |
| | 2100 | .01 | 2,281 | 19,994 |
| | 100 | .02 | 428 | 6,299 |
| | 2100 | .02 | 2,445 | 22,732 |
| 70 | 100 | .01 | 264 | 8,175 |
| | 2100 | .01 | 2,281 | 43,853 |
| | 100 | .02 | 428 | 14,564 |
| | 2100 | .02 | 2,445 | 50,243 |

The high chloride high calcium sulfate slurry leaves the quencher-absorber via conduits 44 and 46 and is directed to crystallizer-modifier 48 when the calcium sulfate is precipitated out as gypsum and the slurry containing the gypsum and calcium chloride is directed via conduit 50 to the filter 52.

In the filter the precipitated gypsum is removed and a part of the effluent is returned to the quencher 36 via line 54 and part is directed to the brine concentrator 18.

In the normal case of flue gas desulfurization processing with or without a by-product gypsum generation, a calcium chloride solution is generated with 10,000 to 50,000 ppm Cl. The control of the chloride concentration affects the materials of construction and some flue gas desulfurization process operating conditions, such as limestone utilization and pH. The calcium chloride concentration can influence the water balance on the process and as such must be computed on a case by case basis. In the process described in FIG. 1 the chloride content can vary between 10,000 to 50,000 ppm and can be economically reduced to a low level.

Figure 2:
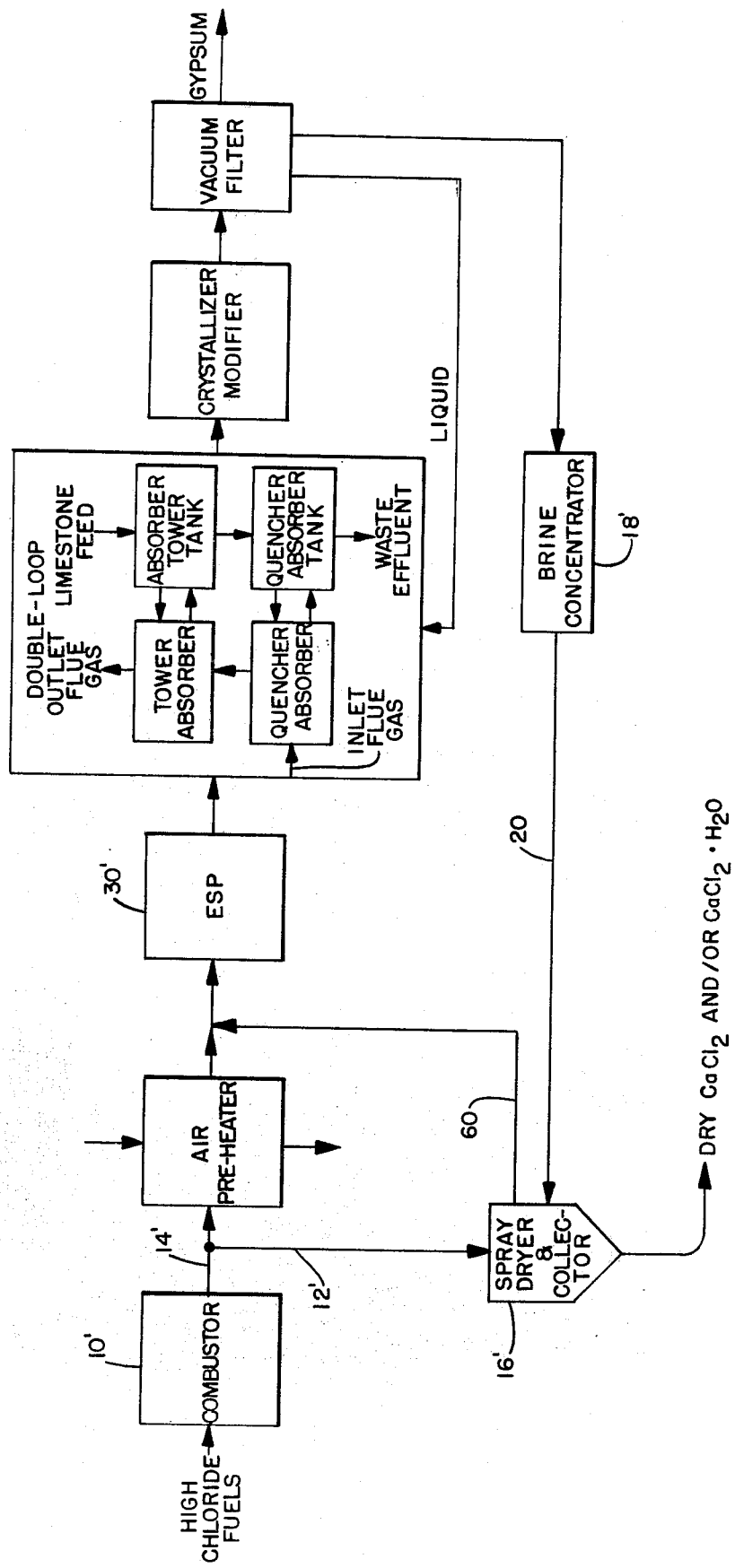
FIG. 2 is a view like FIG. 1 of modified apparatus for carrying out another aspect of this invention.

In the process concept shown in FIG. 2 a fraction of the flue gas is extracted from the combustor 10' existing gas from flue 14' via flue 12' and passed through a spray dryer 16', as described in FIG. 1. In this method the spray dryer exit gases are directed to the inlet side of precipitator 30' via flue 60 system and are not used to concentrate the calcium chloride brine. The brine concentrator 18' in this case can be a vapor compression method or a multiple effect evaporation. Only a very small fraction of flue gas is needed to do the simple drying of the 35% $CaCl_2$ concentrated brine.

To conserve the power plant capacity the spray dryer 16' can be activated during low power demands where energy for evaporation and spray drying can be applied without power reduction or excess capitalization of the power station.

The remainder of the system illustrated in FIG. 2 is identical to that described in reference to FIG. 1 and will not be redescribed

EXAMPLE 1

The process and material balance information for the spray dryer 16 and brine concentrator 18 as follows.

spray dryer;
    gas input from flue 12
    1,150 ACFM
    78.15 lb-m/hr
    750° F.
out-put via conduit 22:
    $CaCl_2 \cdot H_2O(s)$*    1.462 lb/hr
    $CaSO_4(s)$    0.21 lb/hr
    total 1.672(s)
    Flue Gas    1,133 ACFM
    78.6 lb-m/hr
    725° F.
dry products output from spray dryer:
    $CaCl_2H_2O(s)$    4.386 lb/hr
    $CaSO_4(s)$    0.629 lb/hr
    total 5.015 lb/hr
    ~725°
Input to spray dryer from brine concentrator
    $CaCl_2$    5.032 lb/hr
    $CaSO_4$    0.786 lb/hr
    $H_2O$    10.805 lb/hr
    total 16.623 lb/hr
    65% $H_2O$ ~ 250° F.
slurry output from vacuum filter:
    $CaCl_2$    3.774 lb/hr (15,000 ppmw)
    $CaSO_4$    0.629 lb/hr ( 2,500 ppmw)
    $H_2O$    247.2 lb/hr
    total 251.6 lb/hr
    98.3% $H_2O$
    ~ 100° F.

For flue gas system containing a volume of 10,000 ACFM at 750° F., 14.7 psia, 1,000 ppm $SO_2$ and 100 ppm Cl, the recovery of all the calcium chloride in the form of $CaCl_2 \cdot H_2O$ requires 11.5% of the hot gas stream to be directed to the spray dryer and brine concentrator. In this example the 15,000 ppm $CaCl_2$ was used while in actual practice a much higher brine concentration can be generated in the crystallizer modifier and vacuum filter system. This can represent the worse case consideration, the most dilute conditions of chloride exiting the flue gas desulfurization process stream.

For a flue gas containing 100 ppm $Cl^-$, approximately 4.39 lb/hr of $CaCl_2 \cdot H_2O$ is generated contaminated in most cases with 0.629 lb/hr $CaSO_4$. If a more concentrated chloride solution is used before the Brine Concentrator, the $CaSO_4$ contamination can be reduced substantially. Further, if a high grade $CaCl_2 \cdot H_2O$ is needed, then a filtration step can be added to the exit stream on the brine concentrator where precipitated $CaSO_4 \cdot 2H_2O$ can be removed.

EXAMPLE 2

For the process shown in FIG. 2 under the same flue gas conditions that is:

| | |
|---|---|
| 10,000 | ACFM |
| 679.6 | lb-m/hr |
| $SO_2$ | 1000 ppm |
| Cl | 100 ppm |
| 750° F. | |
| 14.7 psia | |

The quantity of flue gas needed to dry the concentrated brine is substantially reduced. Here only 0.76% of the flue gas volume is needed to dry the potential volume of $CaCl_2$ brine generated.

Thus the flue gas to the spray dryer would be:

| | |
|---|---|
| Flue Gas: | |
| 76.5 | ACFM |
| 5.2 | lb-m/hr |
| 750° F. | |
| The gas output from the spray dryer would be: | |
| 65.5 | ACFM |
| 5.62 | lb-m/hr |
| 500° F. | |
| The dry output from the spray dryer would be: | |
| $CaCl_2 \cdot H_2O$ | 4.386 lb/hr |
| $CaSO_4$ | 0.629 lb/hr |
| | total 5.015 lb/hr |
| 500° F. | |

The slurry input to the spray dryer would be:

| | | |
|---|---|---|
| $CaCl_2$ | 3.774 lb/hr | ($\simeq$ 15,000 ppmw) |
| $CaSO_4$ | 0.629 lb/hr | ($\simeq$ 2,500 ppmw) |
| $H_2O$ | 247.2 lb/hr | |
| | total 251.6 lb/hr | |
| | ~100° F. | |

To assure the high degree of monohydrate and some anhydrous $CaCl_2$ the exit temperature is shown at 500° F. In actual practice this system can operate at a temperature as low as 400° F. which could result in further reduction of the spray dryer gas volume. As low as 0.5% of the flue gas volume could effectively dry all the chloride in this case.

The brine concentrator in this case can be a vapor compression system or a multiple effect evaporation. The selection of the most economic system would depend upon the actual operating conditions of the flue gas desulfurization system and power plant. Example 2 can be considered as a non-optimum case since a dilute solution of $CaCl_2$ was used as input to the brine concentrator.

High feed conditions of $CaCl_2$ exiting the vacuum filter system will influence greatly the ratio of $CaCl_2$/$CaSO_4$. By adjusting the $CaCl_2$ to a level of 79,000 ppm $CaCl_4$ (or other dissolved and undissolved solids) can be reduced several fold. Specific material balances can be performed for desired effect.

OTHER INFORMATION

The process system can operate with the following ranges in the process stream:

| | Composition |
|---|---|
| Vacuum Filter Outlet | 15,000 to 79,000 $CaCl_2$ ppm |
| Brine Concentrator | 20% to 40% $CaCl_2$, weight |
| Spray Dryer Gas Outlet for Example 1 Process | 725° F. to 600° F. |
| Spray Dryer Gas Outlet for Example 2 Process | 725° F. to 400° F. |

We claim:

1. A process for drying calcium chloride generated in high chloride content flue gas desulfurization systems comprising the steps:
   1. by-passing a portion of hot combustion gas containing $SO_2$ and chlorides to a spray dryer;
   2. directing a concentrated calcium chloride brine to the spray dryer;
   3. removing dry predominately calcium chloride from the spray dryer;
   4. redirecting the by-passed gas to the main gas stream;
   5. directing the gas stream serially through a gas cleaner and a gas quencher-scrubber;
   6. directing a limestone slurry to the gas quencher-scrubber to react with the $SO_2$ and the chlorides to form calcium sulfate and calcium chloride;
   7. removing calcium sulfate from the spent limestone slurry from the quencher-scrubber and directing the remainder of the calcium chloride containing slurry to a brine concentrator and dust collector, and then to the spray dryer.

2. The process defined in claim 1 further including the steps:
   (a) directing the by-passed gas issuing from the spray dryer to the brine concentrator and dust collector and thereafter redirecting the by-passed gas to the main gas stream; and wherein the concentrated calcium chloride brine directed to the spray dryer is first concentrated in the brine concentrator and dust collector.

3. The process defined in claim 2 wherein the brine concentrator is provided with a calcium chloride containing effluent slurry from a vacuum filter.

4. The process defined in claim 3 wherein the vacuum filter is fed with the spent limestone slurry from the flue gas quencher-scrubber.

5. The process defined in claim 4 wherein the vacuum filter separates gypsum from the spent limestone slurry.

6. The process defined in claim 1 wherein the concentrated calcium chloride directed to the spray dryer is first concentrated in the brine concentrator and dust collector.

7. The process defined in claim 6 where the brine concentrator is provided with a calcium chloride containing effluent slurry from a vacuum filter.

8. The process defined in claim 7 wherein the vacuum filter is fed with the spent limestone slurry from the flue gas quencher-scrubber.

9. The process defined in claim 8 wherein the vacuum filter separates gypsum from the spent limestone slurry.

* * * * *